US012706519B2

(12) United States Patent
Huang et al.

(10) Patent No.: US 12,706,519 B2
(45) Date of Patent: Aug. 11, 2026

(54) HIGHLY EFFICIENT ISOLATED BIDIRECTIONAL DC/AC TOPOLOGIES

(71) Applicant: Board of Regents, The University of Texas System, Austin, TX (US)

(72) Inventors: Qin Huang, Austin, TX (US); Qingyun Huang, Round Rock, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 135 days.

(21) Appl. No.: 18/008,867

(22) PCT Filed: Jun. 11, 2021

(86) PCT No.: PCT/US2021/037032
§ 371 (c)(1),
(2) Date: Dec. 7, 2022

(87) PCT Pub. No.: WO2021/252911
PCT Pub. Date: Dec. 16, 2021

(65) Prior Publication Data

US 2023/0223831 A1 Jul. 13, 2023

Related U.S. Application Data

(60) Provisional application No. 63/038,224, filed on Jun. 12, 2020.

(51) Int. Cl.
*H02M 3/335* (2006.01)
*H02M 1/00* (2006.01)
(Continued)

(52) U.S. Cl.
CPC .......... *H02M 1/007* (2021.05); *H02M 3/158* (2013.01); *H02M 3/33584* (2013.01);
(Continued)

(58) Field of Classification Search
CPC .. H02M 1/0058; H02M 1/007; H02M 1/4241; H02M 3/01; H02M 3/015;
(Continued)

(56) References Cited

U.S. PATENT DOCUMENTS 9,088,178 B2 * 7/2015 Adest ...................... H02J 3/381
9,722,425 B2 * 8/2017 Pape ......................... H02J 1/12
(Continued)

FOREIGN PATENT DOCUMENTS

CN 111064359 A * 4/2020 ........... H02M 3/155
EP 2444872 A2 * 4/2012 ............. H02J 3/385

OTHER PUBLICATIONS

International Search Report and Written Opinion in related application PCT/US2021/037032 dated Sep. 1, 2021.
(Continued)

*Primary Examiner* — Thienvu V Tran
*Assistant Examiner* — Shahzeb K Ahmad
(74) *Attorney, Agent, or Firm* — Patterson + Sheridan, LLP

(57) ABSTRACT

Method and apparatus include a first stage converter configured to generate a half sine wave, and a second stage converter in electrical communication with the first stage converter and configured to transform the half sine wave into a power signal. The second stage converter may further supply the power signal to an electrical grid. In one example, the second stage converter may include an isolated, unregulated, resonant direct current/alternating current (DC/AC) converter.

19 Claims, 4 Drawing Sheets

(51) Int. Cl.
*H02M 3/158* (2006.01)
*H02M 7/48* (2007.01)
*H02M 7/5387* (2007.01)

(52) U.S. Cl.
CPC ....... *H02M 7/4807* (2013.01); *H02M 7/4815* (2021.05); *H02M 7/5387* (2013.01)

(58) Field of Classification Search
CPC .... H02M 3/33584; H02M 3/158; H02M 7/48; H02M 7/4807; H02M 7/4811; H02M 7/4815; H02M 7/4818; H02M 7/4826; H02M 7/5387
See application file for complete search history.

(56) References Cited

U.S. PATENT DOCUMENTS 11,021,069 B1 * 6/2021 Elshaer .................. B60L 50/60
2010/0014325 A1 1/2010 Raju et al.
2010/0244575 A1 * 9/2010 Coccia .................. H02M 7/49 307/82
2011/0090717 A1 * 4/2011 Lee .................. H02M 3/33584 363/21.02
2012/0281441 A1 * 11/2012 Liu .................. H02M 7/48 363/35
2013/0003424 A1 * 1/2013 Song .................. H02M 3/33584 363/21.04

OTHER PUBLICATIONS

Nascimento Kaio C M et al; SST Topology Based on the LLC Resonant Converter and Output Voltage Control by Auxiliary Module, 2019 IEEE PES Innovative Smart Grid Technologies Conference—Latin America ( I SGT Latin America), IEEE, Sep. 15, 2019 (Sep. 15, 2019), pp. 1-6.

Huang Alex Q et al: Medium voltage solid state transformers IECON 2016—42nd Annual Conference of the IEEE Industrial Electronics Society, IEEE, Sep. 21, 2016, pp. 29-42.

Bhattacharjee Amit Kumar et al: An Interleaved Boost and Dual Active Bridge-Based Single-Stage Three-Port DC-DC-AC Converter With Sine PWM Modulation; IEEE Transactions on Industrial Electronics, IEEE Service Center, Piscataway, NJ, USA, vol. 68, No. 6, Jun. 6, 2021 (Jun. 6, 2021), pp. 4790-4800.

* cited by examiner

300
$V_{ac}$
338
308
340
336
334
330
328
326
332
324
322
320
318
316
314
312
310
$V_{Link}$
$V_{dc}$
+
−

HIGHLY EFFICIENT ISOLATED BIDIRECTIONAL DC/AC TOPOLOGIES

CROSS-REFERENCE TO RELATED APPLICATION

This application claims priority to U.S. Application No. 63/038,224, filed Jun. 12, 2020, which is assigned to the assignee hereof and incorporated herein in its entirety.

BACKGROUND

The present invention relates generally to electrical hardware, and more particularly, to power conversion circuitry.

Many power conversion applications, such as photovoltaic (PV) micro-inverters, battery storage systems, and onboard electric vehicle (EV) chargers, among others, require isolated direct current/alternating current (DC/AC) power converters. Conventional power conversion hardware can suffer from low efficiency and density issues, as well as involve complex control and sensing designs that raise costs.

SUMMARY

According to one embodiment of the present invention, an apparatus includes a first stage converter configured to generate a half sine wave. A second stage converter may be in electrical communication with the first stage converter and be configured to transform the half sine wave into a power signal. The second stag converter may further supply the power signal to an electrical grid.

According to another particular embodiment, an apparatus includes a first stage converter configured to generate a half sine wave and an isolated, unregulated, resonant direct current/alternating current (DC/AC) converter in electrical communication with the first stage converter and configured to transform the half sine wave into a full sine wave According to another embodiment, a method includes providing a first stage converter configured to generate a half sine wave, and providing a second stage converter in electrical communication with the first stage converter and configured to transform the half sine wave into a power signal, and to supply the power signal to an electrical grid.

DETAILED DESCRIPTION

Figure 1:
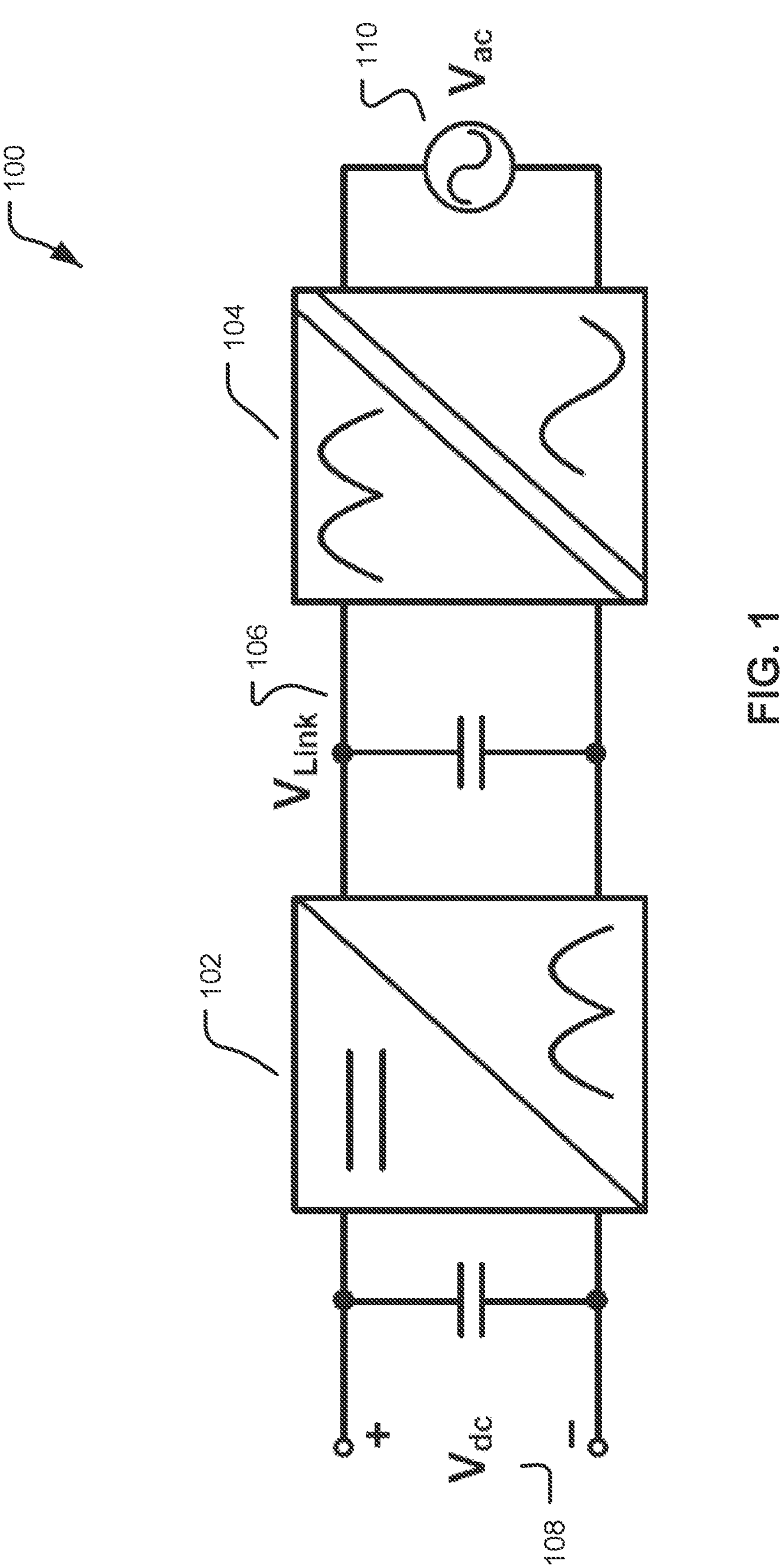
FIG. 1 illustrates a functional block diagram of a system that includes a non-isolated, regulated DC/DC stage coupled to an isolated, unregulated DC/AC stage.

Embodiments of isolated DC/AC conversion circuits achieve high efficiency, high density, low cost, and bidirectional power flow. Examples of the conversion circuits may additionally be simpler to control than conventional hardware. Embodiments may also include a modular design where advantageous.

More particularly, conventional two stage topologies can have simple control mechanisms, but suffer from low efficiency, high cost, and low density considerations. Conventional one stage topologies have higher efficiency and lower associated costs, but are limited by complicated control and low density considerations. An embodiment of the system combines the benefits of one and two stage circuits to improve performance and reduce costs. In addition, modular embodiments may reduce the cost for systems that use multiple DC sources.

An embodiment of the circuit combines a pulse width modulation (PWM) converter and the resonant converter. The cost of configuration may be as low as a single stage application, while achieving higher efficiency. The control and sensing is simpler than that of two stage solutions due to the simple and reliable zero voltage switching (ZVS) control and synchronous rectification (SR) control. Thus, the frequency can be up to MHz level to improve power density. The bidirectional power flow capability makes this solution be suitable for a lot of bidirectional power conversion systems. In addition, the modular extended versions may use a parallel structure to reduce the cost for the systems that include multiple DC sources.

A particular embodiment of a highly efficient isolated bidirectional DC/AC circuit includes a 1.5 stage topology. A first stage may be a regulated, non-isolated bidirectional DC/DC stage. This regulated, non-isolated bidirectional DC/DC stage (e.g., the 1.0 stage) may convert DC voltage to a half sinusoidal waveform. A second stage (e.g., the 0.5 stage) may include an unregulated, highly efficient, fixed-gain, bidirectional isolated resonant DC/AC stage. The 0.5 stage may convert the half sinusoidal waveform to a grid voltage.

Illustrative implementations of the first stage (e.g., the DC/DC stage, or 1.0 stage converter) may include a synchronized buck converter, a buck-boost converter, or a four-switch noninverting buck-boost converter. Thus, an embodiment may comprise a DC-to-DC stepdown converter that steps down voltage (while stepping up current) from an input supply to its output (i.e., load). The efficiency of the first stage may be over 99 percent with either hard or soft switching due to optimized voltage seconds. When operating in a soft switching mode, such as a quasi-square-wave (QSW) zero-voltage-switching (ZVS) mode, the system may significantly increase the switching frequency to a MHz level, while maintaining 99% efficiency. The high frequency of an embodiment may dramatically reduce the size of passive components used in the circuit.

Examples of the second stage (e.g., the DC/AC stage, or 0.5 stage converter) may include a bidirectional resonant converter cascaded with an unfolding bridge, or a bidirectional resonant converter with AC switches on a grid side. For either the primary or secondary side of the resonant converter of the second stage, the topology can be either a full-bridge or a half-bridge configuration. This DC/AC unregulated resonant stage converter may continuously operate at resonant frequency with optimized efficiency of over 99%.

Total efficiencies around 98% for the combined isolated bidirectional DC/AC circuit are consistently realized. Because of the fixed frequency and duty-cycle of the resonant converter, the control may be relatively simple. For instance, there may be no need for extra synchronized rectification sensing and control for secondary side devices, as with some conventional topologies. Thus, higher frequencies (e.g., up to the MHz level) may be generated without complicated control and sensing. As such, power density (e.g., time rate of energy transfer per unit volume) is dramatically improved over conventional techniques. As such, embodiments of the isolated DC/AC circuit may achieve high efficiency, high density, low cost, bidirectional power flow, simple control and modular design.

FIG. 1 illustrates a functional block diagram of a system 100 that includes a non-isolated, regulated DC/DC converter 102 cascaded or otherwise coupled to an isolated, unregulated, resonant DC/AC converter 104. The system 100 may receive power from an energy source 108 and may supply power to an electrical grid 110. As such, the system 100 may control how much power is sent to the electrical grid 110. The system 100 shows a voltage link 106 positioned between the non-isolated, regulated DC/DC converter 102 and the isolated, unregulated DC/AC converter 104.

The non-isolated, regulated DC/DC converter 102 may comprise a controller determining how much power is to be sent, while the isolated, unregulated DC/AC converter 104 may function generally as a multiplier (i.e., unregulated circuit). More particularly, the non-isolated, regulated DC/DC converter 102 may transform a flat input voltage to a half sine wave (e.g., on the positive half of a sine wave) and may control the amplitude. The isolated, unregulated DC/AC converter 104 may convert the half sine wave into a full sine wave. For instance, the isolated, unregulated DC/AC converter 104 may keep a positive half sine wave and transform a next occurring positive half sine wave into a negative sine wave. As such, the non-isolated, regulated DC/DC converter 102 may comprise a non-isolated regulated stage that generates a half sine wave that is communicated to an isolated, unregulated stage.

The isolated, unregulated DC/AC converter 104 may be isolated for safety considerations, such as handling higher voltages, and to prevent DC from flowing through it. Isolated generally refers to having a physical separation that prevents a DC connection. The isolated, unregulated, DC/AC converter 104 may be resonant in that the circuit that has very low impedance at a certain frequency and is very efficient.

Figure 2:
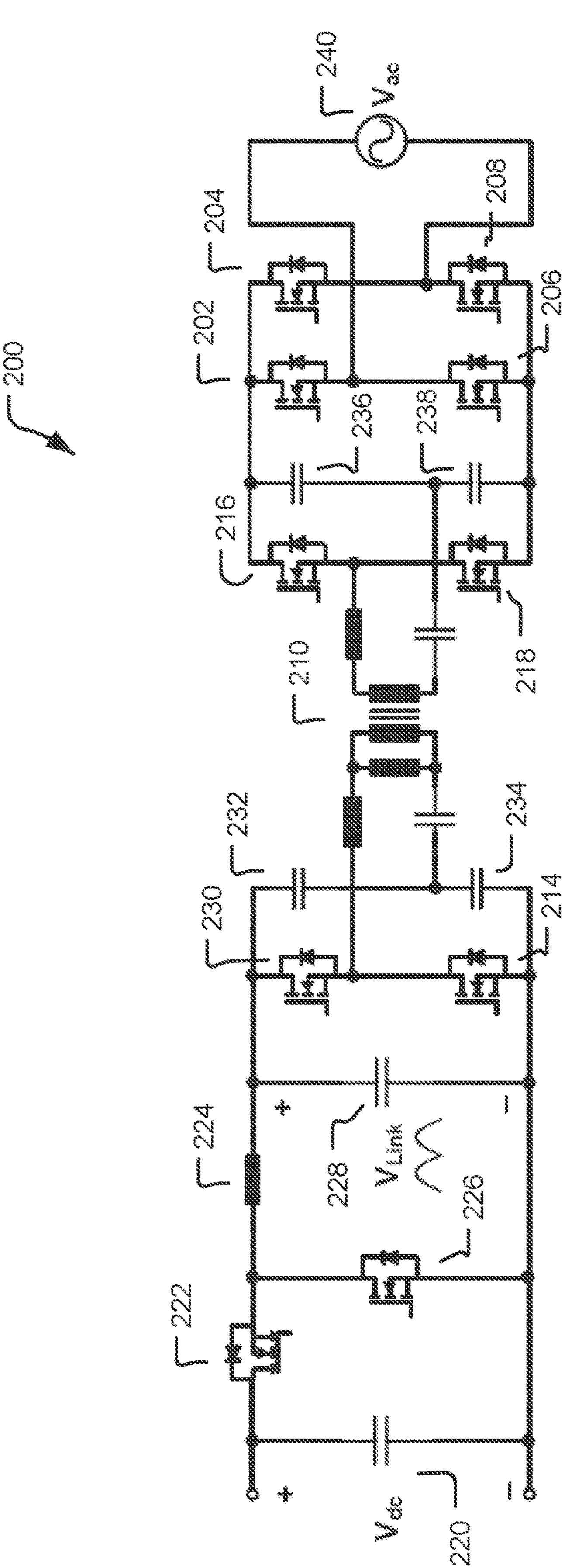
FIG. 2 is a circuit diagram of an embodiment of the system with a minimized switch count with an unfolding bridge.

FIG. 2 is a circuit diagram of an embodiment of a system 200 with a minimized switch count and an unfolding bridge inverter comprising metal-oxide-semiconductor field-effect transistor (MOSFETs) 202, 204, 206, 208. The system 200 may conform to the functional block diagram 100 of FIG. 1. For instance, the first stage circuitry to the left of the voltage link 210 (e.g., comprising resistors and capacitors) may include a first stage functioning as a non-isolated, regulated DC/DC converter, and the second stage circuitry to the right of the voltage link 210 may include a second stage functioning as an isolated, unregulated DC/AC converter. In another respect, the first stage may correspond to a buck transformer, and the second stage may be a resonant converter, plus the unfolding bridge inverter.

The first stage may include a half bridge inverter comprising MOSFETs 212, 214. The half bridge inverter may function to transform an input signal from a power source 220 into an always positive half sine wave.

Another half bridge inverter may comprise MOSFETs 216, 218. This half bridge inverter of the second stage may transform a low voltage (e.g., 100 volt) half sine wave into a high voltage (e.g., 200 volt) half sine wave. The unfolding bridge with MOSFETs 202, 204, 206, 208 may transform the half sine wave to a full sine wave. While MOSTFETs are shown in FIG. 2 and in other embodiments, other implementation may include other types of semiconductor switches.

Figure 3:
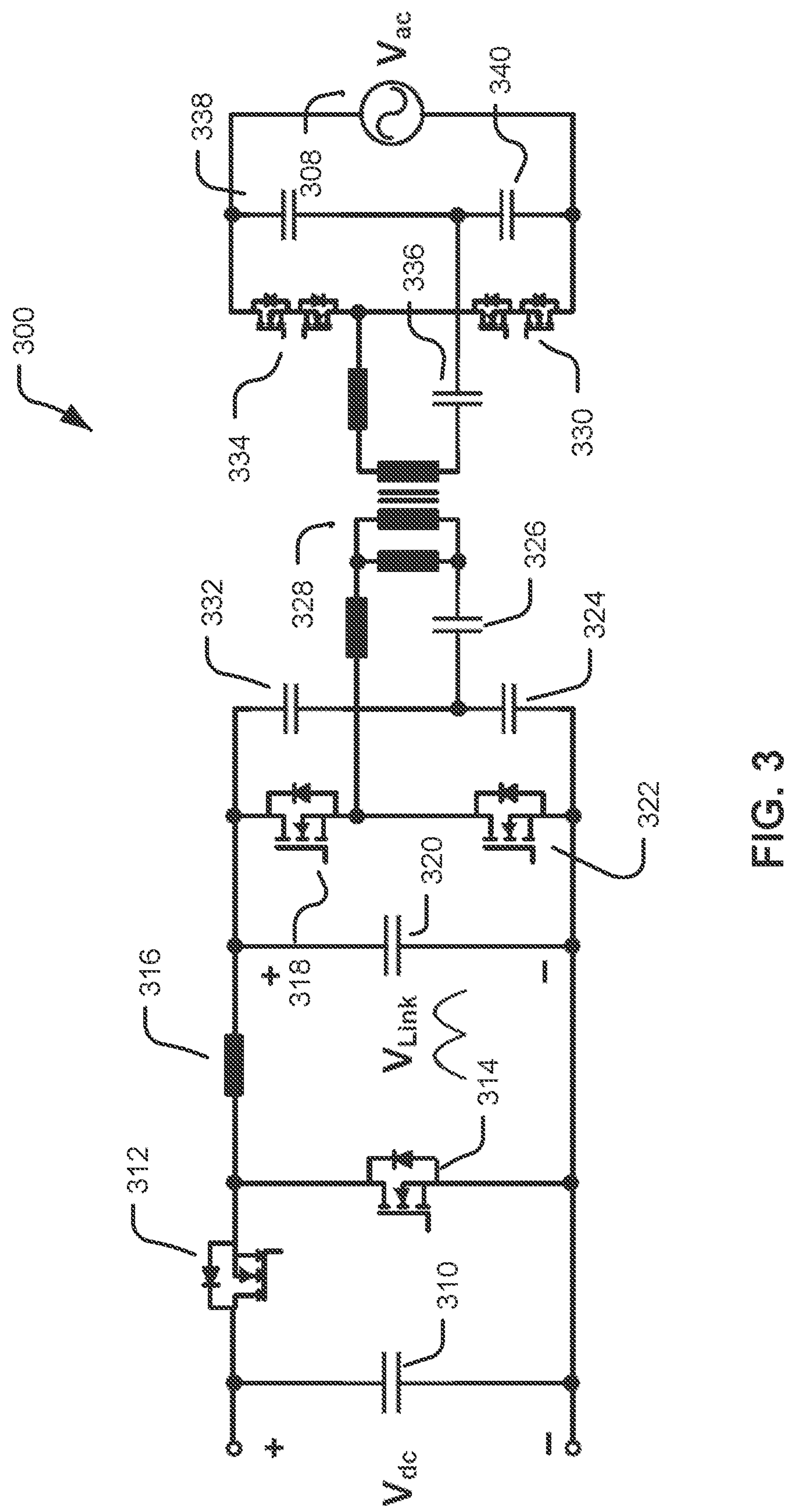
FIG. 3 is a circuit diagram of an embodiment of the system with a minimized switch count with AC switches.

FIG. 3 is a circuit diagram of an embodiment of a system 300 with a minimized switch count and AC switches. The system 300 may conform to the functional block diagram 100 of FIG. 1. For instance, the first stage circuitry to the left of the voltage link 302 (e.g., comprising resistors and capacitors) may include a first stage functioning as a non-isolated, regulated DC/DC converter, and the second stage circuitry to the right of the voltage link 302 may include a second stage functioning as an isolated, unregulated DC/AC converter. The first stage of the embodiment of the system 300 may further be identical or similar to the first stage of the embodiment of the system 200 of FIG. 2.

The second stage of FIG. 3 may include an AC switch comprising two pairs of MOSFETs 304, 306 connected in back-to-back configurations. As such, current may only flow in a particular direction if both transistors of a pair 304, 306 allow it, ensuring that the output to the electrical grid 308 will be a sine wave.

An embodiment of the system may be modular. For instance, smaller sub-circuit configurations may be combined to form larger circuit systems. As shown in the functional block diagram of FIG. 4, multiple DC/DC stage converters 402, 404, 406 of a system 400 may be wired in parallel with a half sine wave voltage link 408. The DC/DC stage converters 402, 404, 406 may share one unregulated resonant DC/AC stage converter 410. Since the isolated DC/AC stage consumes much more devices than the non-isolated DC/DC stage, this modular embodiment may significantly reduce the costs associated with systems that include multiple DC sources. Efficiency and density may also be dramatically improved.

Figure 4:
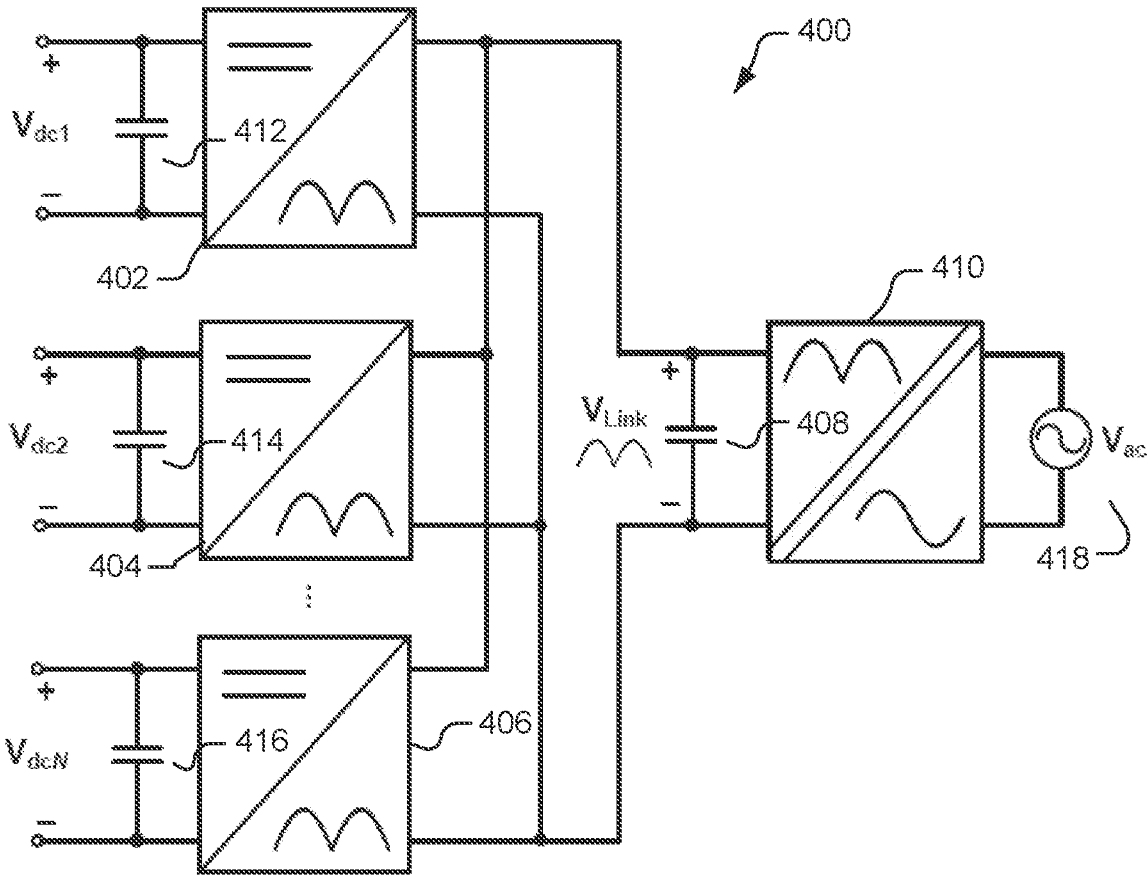
FIG. 4 illustrates a system having multiple DC/DC stages are in parallel with half sine wave voltage link and that share one unregulated DC/AC resonant stage.

The system 400 depicted in the functional block diagram of FIG. 4 is similar to the system 100 in FIG. 1, except the system 400 includes three input power sources 412, 414, 416. The inputs 412, 414, 416 may correspond to three independent energy sources. As discussed herein, the three inputs 412, 414, 416 may be wired in parallel and share the second stage 410.

In operation, circuit embodiments may realize superior performance compared with conventional solutions, including high efficiency, high density, low cost, and bidirectional power flow. The embodiments further feature simple and reliable control and sensing, modular design, and low associated costs.

More particularly, the device count of an embodiment may be as low as a single stage solution. However, the volume and mass are significantly reduced, thus reducing the cost. The control of the DC/DC stage is consistent for soft-switching (and hard-switching). There may be no complicated sensing and control for the DC/AC stage since it operates under a fixed frequency and fixed duty-cycle MHz ZVS and SR control. Thus, the controller is relatively simple and reliable. As discussed herein, the DC/DC stage may achieve 99% efficiency with either hard-switching or soft switching due to the optimized voltage seconds. The DC/AC unregulated resonant stage always works at resonant frequency with optimized efficiency that may be up to 99%. The total efficiency can be up to 98%. Embodiments of the system are compatible with bidirectional power conversion systems. Modular advantages realized using parallel design and shared, isolated DC/AC stage are also described above, particularly with respect to FIG. 4.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

While the foregoing is directed to embodiments of the present invention, other and further embodiments of the invention may be devised without departing from the basic scope thereof, and the scope thereof is determined by the claims that follow.

What is claimed is:

1. An apparatus comprising:

a bidirectional direct current (DC)/alternating current (AC) circuit having a 1.5 stage topology comprising:

a whole stage converter comprising a half bridge inverter configured to transform a DC voltage to an always positive half sine wave having a first voltage, wherein when operating in a soft switching mode, a switching speed of the half bridge inverter increases without degrading an efficiency of the half bridge inverter; and a half stage converter in electrical communication with the whole stage converter, the half stage converter-having a fixed-gain, the half stage converter comprising a half bridge inverter configured to transform the always positive half sine wave having the first voltage to an always positive half sine wave having a second voltage that is higher than the first voltage, the half stage converter further comprising an unfolding bridge inverter configured to transform the always positive half sine wave having the second voltage into an AC power signal, and to supply the AC power signal to an electrical grid.

2. The apparatus of claim 1, wherein the whole stage converter is non-isolated.

3. The apparatus of claim 1, wherein the half stage converter is isolated.

4. The apparatus of claim 1, wherein the half stage converter is unregulated.

5. The apparatus of claim 1, wherein the whole stage converter is regulated.

6. The apparatus of claim 1, wherein the half stage converter is a direct current/alternating current (DC/AC) converter.

7. The apparatus of claim 1, wherein the AC power signal includes a full sine wave.

8. The apparatus of claim 1, wherein a voltage link is positioned in between the whole stage converter and the half stage converter.

9. The apparatus of claim 1, wherein the whole stage converter is one of a plurality of whole stage converters wired in parallel and in electrical communication with the half stage converter.

10. The apparatus of claim 1, wherein the half stage converter further comprises a transformer coupled between the half bridge inverter of the whole stage converter and the half bridge inverter of the half stage converter.

11. The apparatus of claim 10, wherein:

a primary winding of the transformer is coupled to the half bridge inverter of the whole stage converter; and a secondary winding of the transformer is coupled to the half bridge inverter of the half stage converter.

12. The apparatus of claim 1, wherein:

the switching speed increases to greater to at least 1 MHz; and the efficiency of the half bridge inverter is at least 99 percent.

13. An apparatus comprising:

a bidirectional direct current (DC)/alternating current (AC) circuit having a 1.5 stage topology comprising:

a whole stage converter comprising a half bridge inverter configured to transform a DC voltage to an always positive half sine wave having a first voltage, wherein when operating in a soft switching mode, a switching speed of the half bridge inverter increases without degrading an efficiency of the half bridge inverter; and an isolated, unregulated, resonant DC/AC half stage converter in electrical communication with the whole stage converter, the isolated, unregulated, resonant DC/AC half stage converter having a fixed-gain, the isolated, unregulated, resonant DC/AC half stage converter comprising a half bridge inverter configured to transform the always positive half sine wave having the first voltage into an always positive half sine wave having a second voltage that is higher than the first voltage, the isolated, unregulated, resonant DC/AC half stage converter further comprising an unfolding bridge inverter configured to transform the always positive half sine wave having the second voltage into a full sine wave.

14. A method of manufacturing a circuit, the method comprising:

providing a whole stage converter of a bidirectional direct current (DC)/alternating current (AC) circuit having a 1.5 stage topology, the whole stage converter comprising a half bridge inverter configured to transform a DC voltage to an always positive half sine wave having a first voltage, wherein when operating in a soft switching mode, a switching speed of the half bridge inverter increases without degrading an efficiency of the half bridge inverter; and providing a half stage converter of the bidirectional DC/AC circuit having the 1.5 stage topology, the half stage converter in electrical communication with the whole stage converter, the half stage converter having a fixed-gain, the half stage converter comprising a half bridge inverter configured to transform the always positive half sine wave having the first voltage to an always positive half sine wave having a second voltage that is higher than the first voltage, the half stage converter further comprising an unfolding bridge inverter configured to transform the always positive half sine wave having the second voltage into an AC power signal, and to supply the AC power signal to an electrical grid.

15. The method of claim 14, wherein the whole stage converter is non-isolated.

16. The method of claim 14, wherein the half stage converter is isolated.

17. The method of claim 14, wherein the half stage converter is unregulated.

18. The method of claim 14, positioning a voltage link in between the whole stage converter and the half stage converter.

19. The method of claim 14, further comprising a plurality of whole stage converters wired in parallel and in electrical communication with the half stage converter.

* * * * *